3,157,199
DISC VALVE
John Banks, 5472 Broad St., Pittsburgh 6, Pa., and Edward J. Banks, 11221 Azalea Drive, Pittsburgh 35, Pa.
Filed Aug. 25, 1961, Ser. No. 133,941
2 Claims. (Cl. 137—625.11)

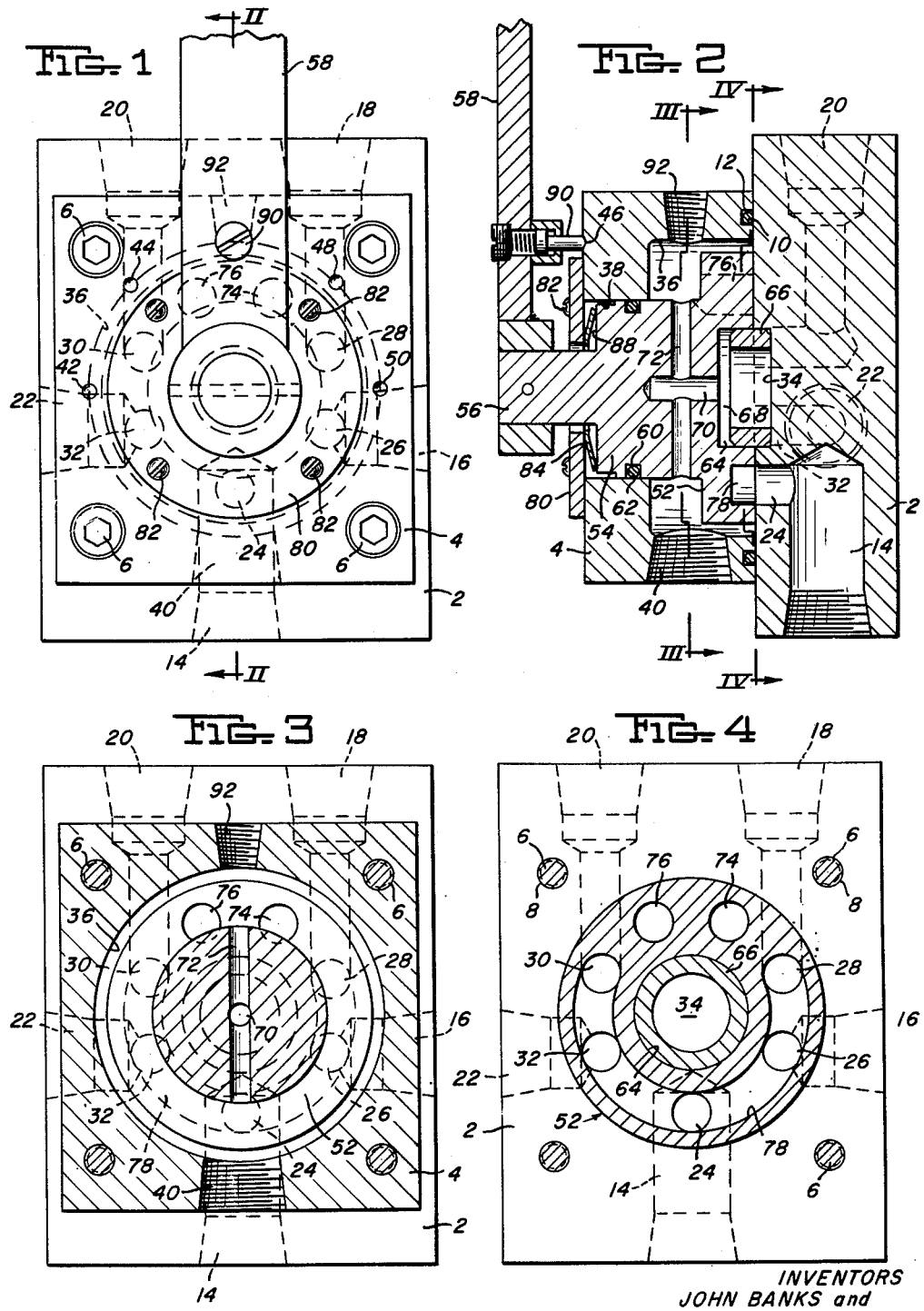

This invention relates to a disc valve and more particularly to such a valve for delivering fluid, such as water, through a plurality of ports. Such valves are in common use, but those in use have various disadvantages. One particular disadvantage is that the incoming fluid pressure has been applied to the full area of the disc and as the fluid pressure and/or the disc area is increased, it is very difficult and impractical to operate the valve by hand and if power operated increased power is required to operate the valve. For that reason the disc valves have been impractical for use at relatively high pressures.

It is therefore an object of our invention to provide a disc valve which may be operated by a relatively low force regardless of the pressure of the fluid being handled.

Another object is to provide such a valve which is simple in construction.

These and other objects will be more apparent after referring to the following specification and attached drawings, in which:

FIGURE 1 is a plan view of our valve;

FIGURE 2 is a sectional view taken on the line II—II of FIGURE 1;

FIGURE 3 is a view taken on the line III—III of FIGURE 2; and

FIGURE 4 is a view taken on the line IV—IV of FIGURE 2.

Referring more particularly to the drawings the reference numeral 2 indicates the valve body which may be made of any suitable material such as aluminum. A valve cover 4 of the same material as body 2 is secured to the valve body 2 by means of four cap screws 6 passing through holes in the cover 4 into threaded holes 8 in body 2. A gasket or O-ring 10 is received in a groove 12 in the cover 4 adjacent body 2. The valve body 2 has five threaded openings 14, 16, 18, 20 and 22 therein spaced around the periphery thereof. Holes 24, 26, 28, 30 and 32 extend transversely from openings 14, 16, 18, 20 and 22, respectively, to the side of body 2 adjacent cover 4. The centers of holes 24, 26, 28, 30 and 32 are arranged on a circle having its center on the center or axis of body 2. A recess 34 is arranged in body 2 at the center thereof on the side adjacent cover 4.

The cover 4 has a central circular opening 36 therein facing body 2 with a reduced diameter hole 38 extending from opening 36 to the side opposite body 2. A threaded hole 40 extends through the wall of cover 4 into opening 36. Five indents 42, 44, 46, 48 and 50 are arranged in the side of cover 4 opposite body 2. The indents 42, 44, 46, 48 and 50 are arranged on a circle having its center on the center of hole 38.

A valve disc 52, preferably made of bronze, is arranged in opening 36 and has a diameter substantially less than the diameter of opening 36. A valve stem 54 extends from disc 52 through hole 38 and has a reduced diameter portion 56 for receiving a lever 58 which may be manually or power operated. The diameter of stem 54 is only slightly smaller than the diameter of hole 38 and is preferably at least one half the diameter of disc 52. A groove 60 is provided in stem 54 for receiving an O-ring seal 62. A recess 64 having the same diameter as recess 34 is provided in disc 52 on the center line thereof in alignment with recess 34. A centering ring 66 is received in recesses 34 and 64 so as to keep the disc 52 centered. The length of ring 66 is less than the combined depth of recesses 34 and 64 so as to provide a cavity 68. An axial hole 70 in disc 52 and stem 54 extends from cavity 68 to a diametrical hole 72 extending through stem 54. Two spaced apart holes 74 and 76 are provided through the disc 52, the spacing between holes 74 and 76 being the same as between holes 26 and 28 and also as between holes 30 and 32. A sector shaped groove 78 extends around the disc 52 from a point adjacent hole 74 to a point adjacent hole 76. A spring retainer 80 is secured to cover 4 around stem portion 56 by means of bolts 82. A spring 84 is secured in recess 86 and bears against shoulder 88 on valve stem 54 so as to seal the valve disc 52 against valve body 2 prior to application of hydraulic pressure. A spring pressed plunger 90 is carried by the lever 58 so as to hold the lever in adjusted position. If desired a threaded hole 92 may be provided in the wall of cover 4 to receive a pressure gauge for determining hydraulic pressure.

In operation, with the lever 58 in the neutral position shown, the hydraulic fluid will enter opening 40 and pass through holes 70 and 72 so as to be on both sides of disc 52. The openings 16, 18, 20 and 22 will be connected to return port 14. If lever 58 is moved one position counter clockwise as shown in FIGURE 1, so that plunger 90 is in detent 44, port 76 will be in alignment with hole 30 so that fluid will flow from opening 40 through port 76 and hole 30 and discharge from opening 20. The other openings 16, 18 and 22 will be connected through groove 78 to return port 14. Turning lever 58 until plunger 90 is in detent 42 will align ports 74 and 76 with holes 30 and 32 so that fluid will discharge through openings 20 and 22. Openings 16 and 18 will be connected through groove 78 to return port 14. Turning the lever 58 clockwise as seen in FIGURE 1 until plunger 90 is in detent 48 will align port 74 with hole 28 so that fluid will discharge through opening 18. The other openings 16, 20 and 22 will be connected through groove 78 to return port 14. Turning lever 58 until plunger 90 is in detent 50 will align ports 74 and 76 with holes 26 and 28 so that fluid will discharge through openings 16 and 18. Openings 20 and 22 will be connected through groove 78 to return port 14.

It will be understood that a greater or lesser number of ports may be provided, it only being necessary that there be an inlet in the cover and at least one opening in the disc 52. Other adaptations and modifications may be made without departing from the scope of the following claims.

We claim:

1. A multiport valve comprising a body member, a cover attached to said body member, said cover having a central generally circular opening in the side thereof adjacent said body member, said cover having an inlet port through the wall thereof extending into said opening and a reduced diameter axial hole extending from said opening to the side of said cover opposite said body member, said body member having a plurality of ports therein opening on the side thereof adjacent said cover, said port openings being arranged on a circle having its center substantially on the valve axis, a generally cylindrical valve disc in said cover opening having a length substantially less than the depth of said cover opening and a maximum diameter less than the diameter of said opening, a sealing chamber between said body member and said cover beyond said opening, a valve stem connected to said disc and extending through said cover opening and said axial hole in close fit therewith extending to the outside of said cover, a sealing member between said valve stem and said axial hole, said disc being positioned in said central cover opening against said body member so as to provide a fluid receiving opening communicating with said inlet port, said disc having at least one valve port therethrough, the center of said last named port being essentially on the same circle as the circle of the port openings in said body member, the diameter of said valve stem being at least one half the diameter of said valve disc, means for rotating said disc, said disc and body member having central circular aligned recesses therein, and a centering ring in said aligned recesses, said ring terminating short of the end of the recess in said disc to provide a cavity, said disc and stem having a conduit therein leading from the outer surface of said stem to said cavity.

2. A multiport valve according to claim 1 including a reduced cross-sectional portion on that end of said valve stem extending to the outside of said cover, a shoulder between the main portion of said valve stem and said reduced cross-sectional portion, a retainer secured to said cover around said reduced diameter stem portion, and a spring between said retainer and said shoulder urging said disc toward said valve body.

References Cited in the file of this patent

UNITED STATES PATENTS

| | | |
|---|---|---|
| 282,313 | Haynes | July 31, 1883 |
| 1,118,297 | McElroy | Nov. 24, 1914 |
| 1,694,616 | Blevins | Dec. 11, 1928 |
| 2,667,745 | Smith | Feb. 2, 1954 |

FOREIGN PATENTS

| | | |
|---|---|---|
| 285,992 | Italy | May 28, 1931 |
| 1,075,683 | France | Apr. 14, 1954 |